T. D. LAKIN.
Converting Motion.
No. 133,994. Patented Dec. 17, 1872.
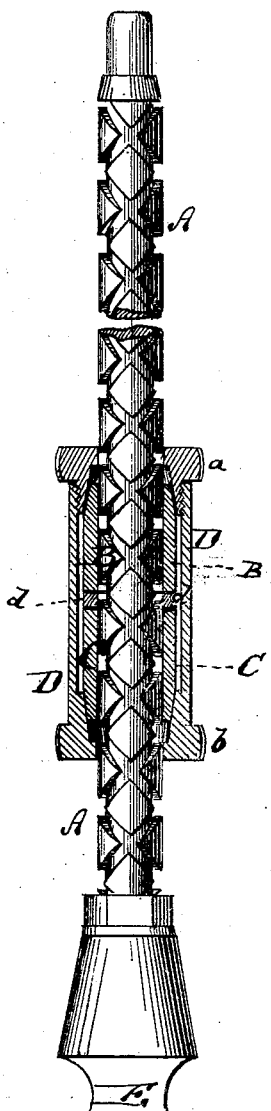
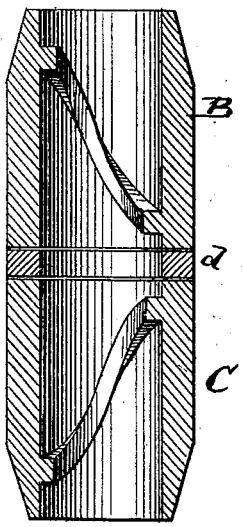

UNITED STATES PATENT OFFICE.

TAYLOR D. LAKIN, OF GREENFIELD, NEW HAMPSHIRE.

IMPROVEMENT IN CONVERTING MOTION.

Specification forming part of Letters Patent No. 133,994, dated December 17, 1872.

*To all whom it may concern:*

Be it known that I, TAYLOR D. LAKIN, of Greenfield, in the county of Hillsborough and State of New Hampshire, have invented a new and Improved Mechanism for Converting Reciprocating into Rotary Motion, of which the following is a specification:

Figure 1 is a side view, partly in section, of the several parts of my improved mechanism. Fig. 2 is a longitudinal section, on a somewhat enlarged scale, of the two nuts which turn the spindle.

Similar letters of reference indicate corresponding parts.

This invention relates to a new mechanical movement in which a right and a left hand nut are arranged within a cylindrical or other case, and surrounding a threaded spindle. When the said cylindrical case is moved longitudinally—that is to say, parallel to the axis of said spindle—it will cause the latter to be revolved continuously in the same direction. This movement will be of great advantage for various purposes; for hand-tools as well as for larger machinery, such as augers, drills, shafts, &c.

In the accompanying drawing, the letter A represents the spindle, which is provided with a double screw-thread—that is to say, with a right-and-left-hand screw-thread,—which thread is formed either by cutting into the spindle,—*i. e.*, by grooving the same,—or it is formed as a projection thereon, as may be considered most convenient. Upon and around this spindle are fitted two nuts, B and C, one of which has a right-hand and the other a left-hand internal screw-thread, which fit, respectively, the two kinds of thread of the spindle. The threads in the nuts are made corresponding to those on the spindle—that is to say, if the spindle-thread is grooved the nut-threads are projecting to enter said grooves, and vice versa. These two nuts are contained within a cylindrical case, D, whose heads or ends *a* and *b* may both be removable, or at least one of them, for the insertion of said nuts. I prefer, also, to hold the two nuts separated from each other by means of a ring, *d*, which is interposed between them. The nuts B C have their ends preferably slightly beveled to become truncated cones, and the inner ends of the cylinder D are made conical to correspond.

Whenever the cylinder D is moved longitudinally in one direction, that nut in it which is being pushed by the follower-head of the cylinder will, by wedging into the conical end of this cylinder, be prevented from turning, and will by its longitudinal motion turn the spindle. As soon as the motion of the cylinder D is reversed the other nut will be pushed and prevented from turning, and will cause the spindle to revolve in the same direction in which it was revolved before by the other nut. Thus, whenever the cylinder D is moved in one direction or the other, and whatever length of stroke it be moved, and with whatever velocity, the cylinder will be revolved by such motion in the same direction continuously as long as the motion of the cylinder D is not interrupted.

The several parts of this mechanism may be made of any suitable size and applied to any desired purpose.

In the drawing, the spindle A is represented as being swiveled in the handle E for use as a hand tool of suitable kind, such as auger, drill, screw-driver, or any other; but the invention is also applicable to the largest kind of machinery, and will be of great advantage, inasmuch as there is no dead-point or dead-center in the motion. The transmission of power from the cylinder to the spindle will be absolute, and can be resumed at any point with unvarying certainty.

Having thus described my invention, I claim as new and desire to secure by Letters Patent—

The combination of the double-threaded spindle A with the right and left nuts B and C, and containing shell D, all arranged with respect to each other to constitute a mechanical movement for converting reciprocating into rotary motion, as set forth.

TAYLOR D. LAKIN.

Witnesses:
A. V. BRIESEN,
T. B. MOSHER.